United States Patent [19]

Yan et al.

[11] Patent Number: 4,664,919

[45] Date of Patent: May 12, 1987

[54] METHOD OF PRODUCING LACTIC-ACID FERMENTED SOY MILK

[75] Inventors: Huang Y. Yan; Wang D. Peng, both of Beijing, China

[73] Assignee: Taishi Foods Company, Ltd., Aomori, Japan

[21] Appl. No.: 687,238

[22] Filed: Dec. 28, 1984

[51] Int. Cl.$^4$ ............................................... A23L 1/20
[52] U.S. Cl. ........................................ 426/46; 426/52; 426/61; 426/634; 435/885
[58] Field of Search ................. 426/43, 44, 39, 46, 426/52, 634, 61; 435/885

[56] References Cited

U.S. PATENT DOCUMENTS

| | | | |
|---|---|---|---|
| 3,096,177 | 7/1963 | Ariyama | 426/46 |
| 3,364,034 | 1/1968 | Hoersch et al. | 426/46 |
| 3,937,843 | 2/1976 | Osaka et al. | 426/46 |
| 3,944,676 | 3/1976 | Fridman | 426/46 |
| 3,950,544 | 4/1976 | Fridman | 426/46 |
| 3,969,534 | 7/1976 | Pavey | 426/43 |
| 3,982,025 | 9/1976 | Hashimoto et al. | 426/46 |

*Primary Examiner*—Jeanette Hunter
*Attorney, Agent, or Firm*—Armstrong, Nikaido, Marmelstein & Kubovcik

[57] ABSTRACT

The inventor has separated lactobacillus of new kind from soybean processed food. The lactic acid bacteria falls under Streptococcus, Lactobacillaceae, Eubacteriales. This bacterium well grows within the soy milk to make yogurt like food free from smell peculiar to soy milk having good taste without additive.

4 Claims, No Drawings

METHOD OF PRODUCING LACTIC-ACID FERMENTED SOY MILK

BACKGROUND OF THE INVENTION

1. Field of the Invention

The present invention relates to a method which uses newly separated lactic acid bacteria to ferment soy milk or processed and controlled (treatment such as sterilization, deodorization, constituent control, etc.) soy milk to produce yogurt like food.

2. Description of the Prior Art

Technologies for using lactic acid bacteria to ferment soy milk have been widely known but a few of them have now been put to practical use. The greatest reason is that in lactic acid bacteria heretofore used for fermented soup, lactic acid bacteria beverages, etc. lactic acid in soy milk is less produced and therefore, auxiliary coagulant, stabilizer or souring materal need to be added, as a consequence of which process of manufacture becomes complicated and flavor and taste are deteriorated.

SUMMARY OF THE INVENTION

In view of the foregoing, the inventor has researched lactic acid bacteria which can make yogurt like food which grows well in soy milk, produces a sufficient amount of lactic acid and obtains good flavor and taste without addition of coagulant, stabilizer and souring material. As a result, its has been found that when lactic acid bacteria separated from soy-bean processed food is cultured in soy milk, it grows well and a large amount of lactic acid are produced. In lactic acid bacteria heretofore known, for example, in those described in Japanese Patent Publication No. 22070/76, 200-250 mg % of lactic acid are merely produced by culture for 12 hours at 40° C. but in the present strain, 400-500 mg % of lactic acid are produced by culture for 6 hours at 40° C., and soy milk is completely aggregrated, presenting yogurt like properties.

Newly separated lactic acid bacteria has been classified in accordance with Bergey's Manual of Determinative Bacteriology, Vol. 8, and it has been judged to belong to Streptococcus. However, on close investigation of bacteriological properties thereof, bacterium having the same properties as that of the present bacterium is not described in said Vol. 8 and other references, and the inventor regards it as a new kind, and called "Streptococcus sojalactis". The bacteriological properties thereof are as follows:

(1) Morphological properties (glucose, bouillon culture medium)
  (1) Cell shape: Normally, spherical bacterium or circular bacterium forming more than 10 chains
  (2) Size: 1-1.2 micron
  (3) formation of spore: none
  (4) Flagellum: none
  (5) Motility: none
  (6) Gram dying: positive
  (7) Anti-oxidizing properties: none (2) Physiological properties
  (1) Demand of oxygen, faculative anaerobic properties
  (2) Growth PH:
    PH=4.0: Grows
    PH=4.4: Grows
    PH=5.0: Grows
    PH=6.0: Grows
    PH=7.0: Grows
    PH=8.0: Not grow
    PH=9.6: Not grow
  (3) Growing temperature
    10° C.: Not grow
    20° C.: Not grow
    30° C.: Grows
    37° C.: Grows
    40° C.: Grows 45° C. Not grow
  (4) Salt resisting prop.:
    2% salt: Grows
    3% salt: Grows
    4% salt: Growth is doubtful
    6.5% salt: Not grow
  (5) Heat resistance
    Heating for 5 min. at 55° C.: Grows
    Heating for 5 min. at 60° C.: Not grow
  (6) V.P reaction: Negative
  (7) M.R test: Positive
  (8) Liquefaction of gelatin: Not liquefied
  (9) Decomposition of starch: Not decomposed
  (10) Decomposition of caseine: Not decomposed
  (11) Formation of indole: Not formed
  (12) Formation of hydrogen sulfide: Not formed
  (13) Reduction of nitrite: Not reduced
  (14) Formation of ammonia from arginine: Not formed
  (15) Penicillin resistance: None
  (16) Reduction of nitrate: Not reduced
  (17) Catalase activity: None
  (18) Oxidase activity: None
  (19) Assimilation of citric acid: Not assimilated
  (20) Decomposition of hippuric acid: Not composed
  (21) Fermentativeness of saccharides (One which is fermented to form lactic acid is +, and one which is not fermented is —):
    (a) Arabinose: —
    (b) Xylose: —
    (c) Glucose: +
    (d) Fructose: —
    (e) Galactose: ±
    (f) Sorbitol: —
    (g) Mannose: —
    (h) Ramnose: —
    (i) Sucrose: +
    (j) Maltose: —
    (k) Trehalose: —
    (l) Raffinose: —
    (m) Dextrin: —
    (n) Starch: —
    (o) Inulin: —
    (p) Glycerol: —
    (q) Mannitol:
    (r) Sorbit: —
    (s) Salicin: —
    (t) Lactose: +
  (22) Generation of gas: Not generated (3) State of Growth
  (1) Litmus milk is reduced and solidifed.
  (2) Methylene blue milk. Not grown by 0.1% methylene blue milk.
  (3) Sodium azide culture medium. Grown by 0.02% sodium azide culture medium.
  (4) TTC (2.3.5. triphenyltetradium) culture medium. Grown by 0.02% TTC culture medium.
  (5) 40% bile culture medium. Grows.
  (6) Coloring matter. Not formed (4) Others
  (1) Hemolysis: Alpha hemolysis is presented.
  (2) Lancefield antigen antibody reaction
    N group: Reaction at 1:1–1:4
    Q group: Reaction at 1:2–1:4
    O group: No reaction On search of the classificatory position of the present bacterium by the above-described Bergey's Manual on the basis of the aforementioned properties, it falls under Streptococcus, Lactobacillaceae, Eubacteriales. When comparing it with a known bacterium belonging to streptococcus, it is approximate to *Streptococcus cremoris*, *streptococcus lactis* and *Streptococcus mitis*. However, there are some differences from these bacteria in main characteristics. Table I gives a comparison in nature between known lactic acid bacteria and newly separated bacterium.

group and to form lactic acid. Generally, lactic acid bacteria used to produce fermented soup must have lactose or glucose. However, since a necessary amount of lactose and glucose is not present in the bean soup, the growth of lactic acid bacteria is not good, the soy milk is not solidified, and formation of lactic acid bacteria is extremely small. Accordingly, it has been necessary to add lactose or glucose in order to make yogurt like food with soy milk as material. Since the present bacterium can grow making use of sucrose present in soy milk, saccharides are not always necessary to be added but yogurt like food may be produced only by soy milk.

Table II gives the state of growth of typical lactic acid bacteria in soy milk with change in PH and value of titratable acidity.

TABLE I
Comparison Between Known Lactic Acid Bacteria and Newly Separated Bacterium

|  | Newly separated bacterium | *Str. soya | Str. themophilus | Str. lactis | Str. cremoris | Str. mitis |
|---|---|---|---|---|---|---|
| Growing temp. | | | | | | |
| 10° C. | − | + | − | − | + | − |
| 45 | − | + | + | − | − | + or − |
| 50 | − | − | + | − | − | − |
| Heat resistance (60° C., 30 min.) | + | + | − | − | − | |
| Reduction of litmus | + | − | − | + | + | + |
| Growth with 0.1% methylene blue milk | + | − | − | + | + or − | − |
| Formation of ammonia from arginine | − | + | − | + | − | + or − |
| Growth with 40% bile culture medium | + | Not grown with 10% deoxycole acid culture medium | − | + | + | − |
| Utilization of sugar | | | | | | |
| raffinose | − | + | ± | − | − | + or − |
| saccharose | + | + | + | ± | − | + |
| lactose | + | − | + | + | + | + |
| Hydrolysis of starch | − | − | + | − | − | − |
| Growth with 0.05% TTC culture medium | − | + | + | ND | + | ND |
| Growth with 0.03% sodium azide culture medium | + | − | ± | ND | + | ND |
| Hemolysis | α | r | α | weak α-r | weak α-r | α |

*Cited reference: Japanese Patent Publication No. 51-22070 (BIKOKWNKINYO No. 1837)
ND ... No data
± ... Reaction indefinite
+ or − ... Positive or negative depending on strain In view of the fact that the Lancefield serum group is also different from the above-described bacterium, it has been judged to be a new bacterium and called *Streptococcus sojalactic*.

The applicant commits the present bacterium to the Microorganism Research Institute of Industrial Technology, Agency of Industrial Science & Technology, and Entrustment No. thereof is No. 6926 (FERM-P-6926).

DETAILED DESCRIPTION OF THE INVENTION

In the following, a description will be given of a method for producing lactic-acid fermented soy milk using the present bacterium. A first characteristic of the present bacterium is to grow only soy milk as a culture

TABLE II
Growth of Various Lactic Acid Bacteria Soy Milk (16-hour culture)

| Kind of lactic acid bacteria | Final PH | Titratable Acidity % |
|---|---|---|
| Before culture | 6.40 | 0.14 |
| Streptococcus lactis | 5.93 | 0.30 |
| Streptococcus cremoris | 6.08 | 0.27 |
| Streptococcus thermophilus | 4.40 | 0.49 |
| Streptococcus diacetilactis | 5.83 | 0.27 |
| Lactobacillus delbrueckii | 4.80 | 0.42 |
| Lactobacillus bulgaricus | 6.32 | 0.21 |
| Lactobacillus casei | 6.18 | 0.17 |
| Present strain | 4.25 | 0.56 |

A second characteristic of the present bacterium is that a solid material obtained by fermenting soy milk is excellent in taste. Important factors influencing on the taste of lactic acid fermented soy milk include, in addition to the amount of formation of lactic acid previously mentioned, removal of greens' smell peculiar to soybeans and the amount of formation of aroma constituent (such as diacetyl, acetone, etc.) peculiar to lactic acid bacteria products. The present strain is characterized in that the force for removing smell of soybeans is great and the amount of formation of diacetyl and acetone is larger than that of other lactic acid bacteria. Table III gives comparison of taste of solidified material obtained by culture in soy milk between various lactic acid bacteria and the present bacterium.

TABLE III

Properties and Taste of Fermented Soy Milk by Various Lactic Acid Bacteria

| Kind of Lactobacillus | Nature of solidified material | Presence of smell of soybean | Presence of smell of acetone, diacetyl | Acidity | Unpleasant smell |
|---|---|---|---|---|---|
| S. thermophilus | solidified | + | ± | ++ | − |
| S. lactis | not solidified | ++ | − | − | + |
| S. diacetilactis | Weakly solidified | + | − | − | + |
| L. bulgaricus | not solidified | ++ | − | − | − |
| L. acidophilus | solidified | + | − | − | + |
| S. cremoris | weakly solidified | + | − | − | + |
| Present strain | solidified | ± | ++ | ++ | − |

++ very strong
+ strong
± almost none
− none at all

DESCRIPTION OF THE PREFERRED EMBODIMENTS

Embodiments of the present invention will be described hereinafter.

EMBODIMENT 1

Soybeans as material are well cleaned, after which they are immersed into a flow at 14° to 15° C. for 16 to 18 hours to sufficiently absorb water. Next, the material is crushed while adding water of about 7 times thereto, and then heated and filtered to obtain soy milk. The bean soup is adjusted to have suitable density of solid in the range 6.5% to 5.5%, after which sweetenings, spices or the like are added or not added depending on one's taste while maintaining high temperature, and cooled to approx. 40° C. The thus prepared soy milk is inoculated with a cultured liquid, in the range of 4 to 6%, of the present bacterium separately purely cultured, well stirred and mixed, immediately filled into a commercially available container, and sealed, after which it is fermented for 6 hours at 40° C. As a result, the whole soy milk is evenly and completely solidified, and final PH thereof is 4.25 and the amount of formed lactic acid is 410 mg %. As previously mentioned, the properties were such that the greens' smell peculiar to soybean was disappeared, the product has yogurt like smell and fermented soy milk of moderate acidity was obtained.

EMBODIMENT 2

15–20% of juice neutralized and sterilized before hand is added to soy milk whose solid density is adjusted to 7.0–7.5% to adjust PH to more or less 6.40, after which the cultured liquid of the present bacterium of 4 to 6% is inoculated and fermented to obtain fruit flavored yoghurt like products.

EMBODIMENT 3

Soy milk prepared similarly to Embodiment 1 is introduced into a culture tank sterilized before hand, into which 4–6% of cultured liquid of the present bacterium is added. They are cultured for 6 to 8 hours while maintaining a temperature at 40° C., after which they are crushed into which pectin or the like as a stabilizer is added and thereafter homogenized by a homogenizer to thereby obtain liquid-like lactic-acid fermented soy milk.

What is claimed is:

1. A process for producing yogurt-like food said process comprising fermenting soy milk under the following conditions using Streptococus sojalactis:
    washing soybeans and thereafter immersing them into water at a temperature in the range of 14° to 20° C. for 16 to 20 hours, pulverizing the soybeans while adding water in the amount of about 5 to 8 times the quantity of the soybeans and subsequently heating and filtering the pulverized soybean material to obtain soy milk;
    adjusting the solid portions of the soy milk to 5 to 10%, and sterilizing the soy milk at a temperature in the range of 110° C. to 120° C. for 15 to 60 minutes;
    then cooling the soy milk to 30° C. to 40° C., followed by innoculating purely cultivated Streptococcus sojalactis bacterium in the amount of 4 to 6% and filling the innoculated soy milk into a container;
    and fermenting the resulting product, after being filled, for 5 to 8 hours at a temperature in the range of 35° to 40° C., after fermentation, cooling the product to 2° to 10° C., and obtaining yogurt-like food.

2. The process for producing yogurt-like food of claim 1, further comprising the addition of at least one flavoring choosen from the group consisting of, a sweetener in the amount of 6 to 9%, a sterilized and neutralized juice in an amount of 15 to 20%, and spices.

3. A process for producing liquid-like lactic acid soy milk drinks said process comprising fermenting soy milk under the following conditions using Streptococus sojalactis:
    washing soybeans as a raw material and thereafter immersing them into water at a temperature in the range of 14° to 20° C. for 16 to 20 hours; pulverizing the soybeans while adding water in the amount of about 5 to 8 times the quantity of the soybeans and subsequently heating and filtering the pulverized soybean material to obtain soy milk;
    adjusting the solid portions of the soy milk to 4 to 6%, and sterilizing the soy milk at a temperature in the range of 110° C. to 120° C. for 15 to 60 minutes
    introducing the sterilized soy milk to a cultivating tank and cooling it to 35° to 40° C., inoculating purely cultivated Streptococus sojalactis bacterium of 4 to 6% and fermenting it for 5 to 8 hours at 35° to 40°; after fermentation, adding pectin as a stabilizer, homogenizing the material under a pressure of 50 to 150 kg/cm² by a homogenizer, and cooling it to 2° to 10° C. to obtain liquid-like lactic acid soy milk drinks.

4. The process for producing soy milk drinks of claim 3, further comprising the addition of at least one flavoring choosen from the group consisting of, a sweetener in the amount of 6 to 9%., a sterilized and neutralized juice in an amount of 15 to 20%, and spices.

* * * * *